May 4, 1943.  A. E. YENSEN  2,318,277

SHOVEL

Filed Feb. 3, 1942

Arthur E. Yensen
INVENTOR.

Patented May 4, 1943

2,318,277

UNITED STATES PATENT OFFICE 2,318,277

SHOVEL

Arthur Ellwood Yensen, Lowell, Nebr.

Application February 3, 1942, Serial No. 429,424

1 Claim. (Cl. 294—49)

This invention has, as one of its objects, the provision of a shovel equipped with a manipulating means so constructed that it will be unnecessary for an operator to bend low in acquiring a shovel-load, the shovel having a proper balance in the hands of an operator.

The invention aims to provide a shovel which can be operated with a minimum amount of exertion. The device is so constructed that the operator will have a good view of the shovel blade, throughout the forward portion thereof, when the blade is advanced to acquire a load.

The shovel disclosed in the present application can be worked readily where space is small and can be manipulated with increased accuracy under all conditions.

A right handed person can shovel left handed, with no sense of awkwardness, and the same feature accrues to the advantage of a left handed shoveler who changes to a right hand procedure.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
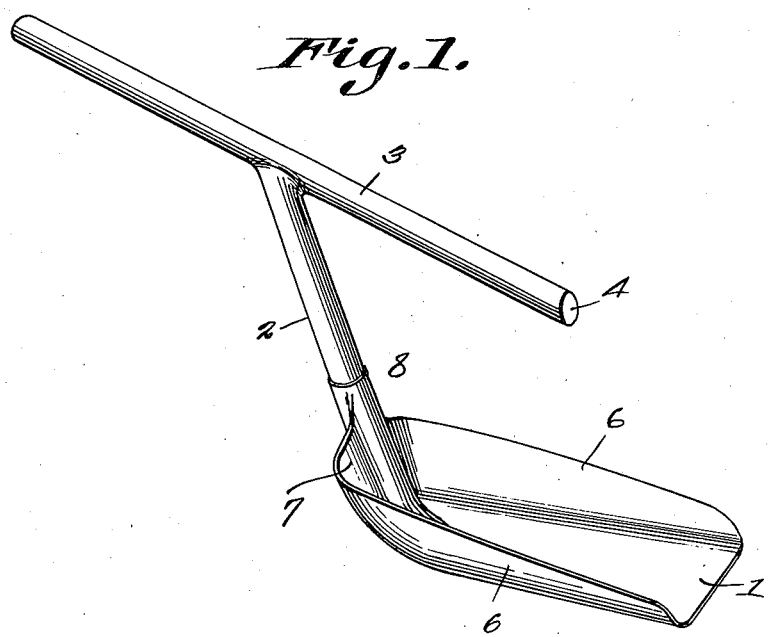
Fig. 1 shows in perspective, a shovel constructed in accordance with the invention.
Figure 2:
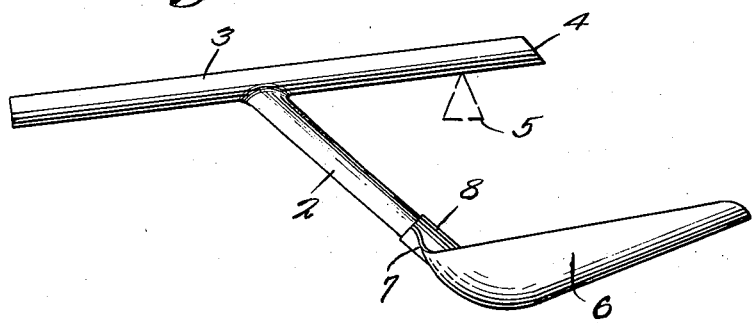
Fig. 2 is a side elevation.

The word "shovel," used hereinbefore and hereinafter, is to be construed to cover scoops, and all implements which function like a shovel.

The shovel forming the subject matter of this application comprises a blade 1, an upstanding stock 2 secured to the rear end of the blade, and an elongated handle 3 secured midway between its ends to the upper portion of the stock, the forward end of the handle overhanging the blade, the stock and the handle being disposed in a plane at right angles to the blade and passing through the median line of the blade.

The stock 2 has a backward slant, and defines an acute angle with respect to the blade 1.

The handle 3 must be of considerable length in order that the operator may have proper control of the implement when one hand is at the forward end of the handle, the other hand being at the rear end of the handle, the hands being disposed neither too closely together nor too widely apart. The backward slant of the stock 2 sets the forward end of the handle 3 and the corresponding hand of the operator back far enough so that the operator has a good view of practically the forward half of the blade 1, as the blade is advanced horizontally to acquire a load, the operator being in a stooping posture. In order to promote a view of the blade 1, the forward end surface 4 of the handle 3 has an upward and backward slant, following the natural backward slant of the clenched thumb and forefinger of the hand that is at the forward end of the grip.

The handle 3 has a downward and forward slant and defines an acute angle with respect to the blade 1.

Often the shovel is used to cast material upwardly and backwardly, over the operator's shoulder. Under such circumstances, the blade 1 has to travel through an arc of approximately 180 degrees. Since the handle 3 has a downward and forward slant and defines an acute angle with respect to the blade, the material on the blade is prevented from being thrown off until the blade has reached a position well above the operator's shoulder.

The shovel balances at the place designated by the reference numeral 5, and close to the forward end of the handle 3. This feature makes the shovel easy to manipulate.

The blade 1 and the means for connecting it to the handle 3 may be of any desired sort. As shown, but not of necessity the blade 1 is provided with side walls 6 connected by a back 7, a rearwardly inclined socket 8 being interposed in the back, the lower end of the stock 2 being secured in the socket.

Having thus described the invention, what is claimed is:

A shovel comprising a blade, a stock having a backward slant and having its lower end secured to the rear end of the blade, and an elongated handle secured at a place midway between its ends to the upper end of the stock, the part of the handle which is ahead of the stock being shorter than the blade and forming an acute angle with the stock, the handle and the stock being disposed in a plane at right angles to the blade and passing through the median line of the blade.

ARTHUR ELLWOOD YENSEN.